United States Patent [19]
Daugherty et al.

[11] 3,805,875
[45] Apr. 23, 1974

[54] INJECTION APPARATUS

[75] Inventors: Donald A. Daugherty, Euclid; John H. Simmons, Lyndhurst, both of Ohio

[73] Assignee: Precision Metalsmiths, Inc., Cleveland, Ohio

[22] Filed: June 16, 1972

[21] Appl. No.: 263,420

[52] U.S. Cl................ 164/159, 164/45, 249/66, 249/67, 425/247, 425/250, 425/308, 425/437, 425/444
[51] Int. Cl.................................................... B22c
[58] Field of Search........... 425/437, 444, 308, 247, 425/250; 249/66 A, 67, 68

[56] References Cited
UNITED STATES PATENTS

| | | | |
|---|---|---|---|
| 2,298,716 | 10/1942 | Moreland et al. | 425/437 X |
| 2,578,719 | 12/1951 | Moyer et al. | 425/250 X |
| 2,770,011 | 11/1956 | Kelly | 425/250 X |
| 2,929,105 | 3/1960 | Starck et al. | 425/437 |
| 2,995,775 | 8/1961 | Schmitzins et al. | 425/247 X |
| 3,584,337 | 6/1971 | Aoki | 425/437 X |
| 3,605,181 | 9/1971 | Posner | 425/437 |
| 3,660,002 | 5/1972 | Morroni | 425/437 X |

Primary Examiner—J. Spencer Overholser
Assistant Examiner—Ronald J. Shore
Attorney, Agent, or Firm—Watts, Hoffman, Fisher & Heinke Co.

[57] ABSTRACT

Apparatus is disclosed for injecting parts from a fluid material such as a wax blend, the apparatus including a runner block assembly having a main channel which is inclined with respect to the vertical, at least one die assembly having a cavity which preferably communicates with the main channel through a tunnel gate, and a nozzle arranged to emit a blast of air-lubricating fluid spray into the die cavity. The injected parts are cut from their runner systems when the die assembly is opened and, by reason of the inclined formation of the runner channel and the blast of fluid spray which is directed into the die cavity, the parts and runner systems are automatically ejected into separate containers. A fluid wax blend or other injection material is injected into the runner block assembly from a heated reservoir tank having an external, helical groove formed in its cylindrical side wall. An electric heating cable is engaged in the groove so that at least 50 percent of the circumference of the cable is in contact with the tank wall to provide rapid, uniform heating of the injection material in the tank.

4 Claims, 9 Drawing Figures

INJECTION APPARATUS

SUMMARY OF THE INVENTION

The present invention relates to injection apparatus of a type including a die assembly mounted by relatively movable platens, a runner block assembly mounted by the platens and having a runner cavity communicating with the die cavity, and structure for supplying a heated, fluid injection material to the runner and die cavities.

An object of the present invention is to provide a compact, inexpensive injection apparatus of the type described which is particularly adapted automatically to inject wax blends and similar material in the production of investment casting patterns and the like.

Another object of the present invention is to provide an injection apparatus of the type described which is adapted in an automatic operation to separate the injected parts from their runner systems.

A further object of the present invention is to provide an injection apparatus of the type described characterized by a runner block assembly having a runner cavity with a main portion which extends from an inlet opening in a direction inclined with respect to the vertical, whereby the runner injected in the cavity can be ejected in a forwardly and downwardly direction.

Still another object of the present invention is to provide an injection apparatus as described in any of the previous paragraphs and further including a spray nozzle arrangement adapted to direct a blast of fluid into the cavity of the die assembly for the purposes of lubricating the die and causing the injected part and its runner system to be ejected into different containers.

Yet another object of the present invention is to provide an injection apparatus of the type described including a reservoir for supplying a heated, fluid injection material to the runner block assembly, the reservoir being of an inexpensive construction adapted to obtain rapid and uniform heating of the injection material.

The foregoing objects of the invention are attained by a preferred construction including a pair of relatively movable platens, and a runner block assembly and at least one die assembly carried by the platens for movement between open and closed positions. The runner block assembly in its closed position defines a runner cavity including an inlet opening, a main portion extending from the inlet opening in a direction which is inclined with respect to the vertical, and a transversely extending second portion which communicates with the cavity of the die assembly. The die assembly is preferably provided with structure for cutting the injected parts from their runner systems at the same time that the parts and runner systems are ejected from the die cavity and runner cavity, respectively. A spray nozzle is arranged above the die assembly in position to direct a blast of fluid, preferably an air-lubricant spray, into the die cavity in a downwardly and laterally outward direction with respect to the adjacent runner block.

An important feature of the described embodiment resides in the formation of the runner block assembly and in the provision of the spray nozzle. Because of the sloping runner channel which is preferably inclined at an angle of about 30° from the vertical, the runners injected in the runner block assembly will be thrown forwardly and downwardly during ejection. At the same time, the fluid spray which is directed into the die cavity when the die assembly is opened causes the parts to be ejected in such a manner that the parts and their runner system fall into separate containers. This automatic separation of the parts from their runners during ejection eliminates subsequent handling as is required with conventional injection machines. The runners are ready to be remelted immediately after the injection cycle, and it is not necessary to subject the runners to granulating or grinding operations.

Another important feature of the present invention resides in the construction of a heated reservoir for melting and supplying a hot wax blend or other similar fluid material to the injection dies. The new reservoir provided by the invention is characterized by a welded, one-piece tank construction having a helical groove cut in its cylindrical side wall. A high temperature electric heating cable is held in this groove by a friction fit so that in the preferred construction at least 50 percent of the circumference of the cable engages the metal wall of the tank. This construction is inexpensive to manufacture and provides for rapid and uniform heating of the wax or other injection material. The new reservoir is further characterized by an outlet tube assembly which is constructed and arranged in a manner which avoids chilling of the hot injection material as it is supplied from the reservoir to the runner block assembly.

Still other features, advantages and a fuller understanding of the invention will be had from the following detailed description when taken in conjunction with the accompanying drawings.

BRIEF DESCRIPTION OF THE DRAWINGS

FIG. 9 is an enlarged, fragmentary cross-sectional view of the apparatus shown in FIG. 6.

DESCRIPTION OF THE PREFERRED EMBODIMENT

Figure 1:
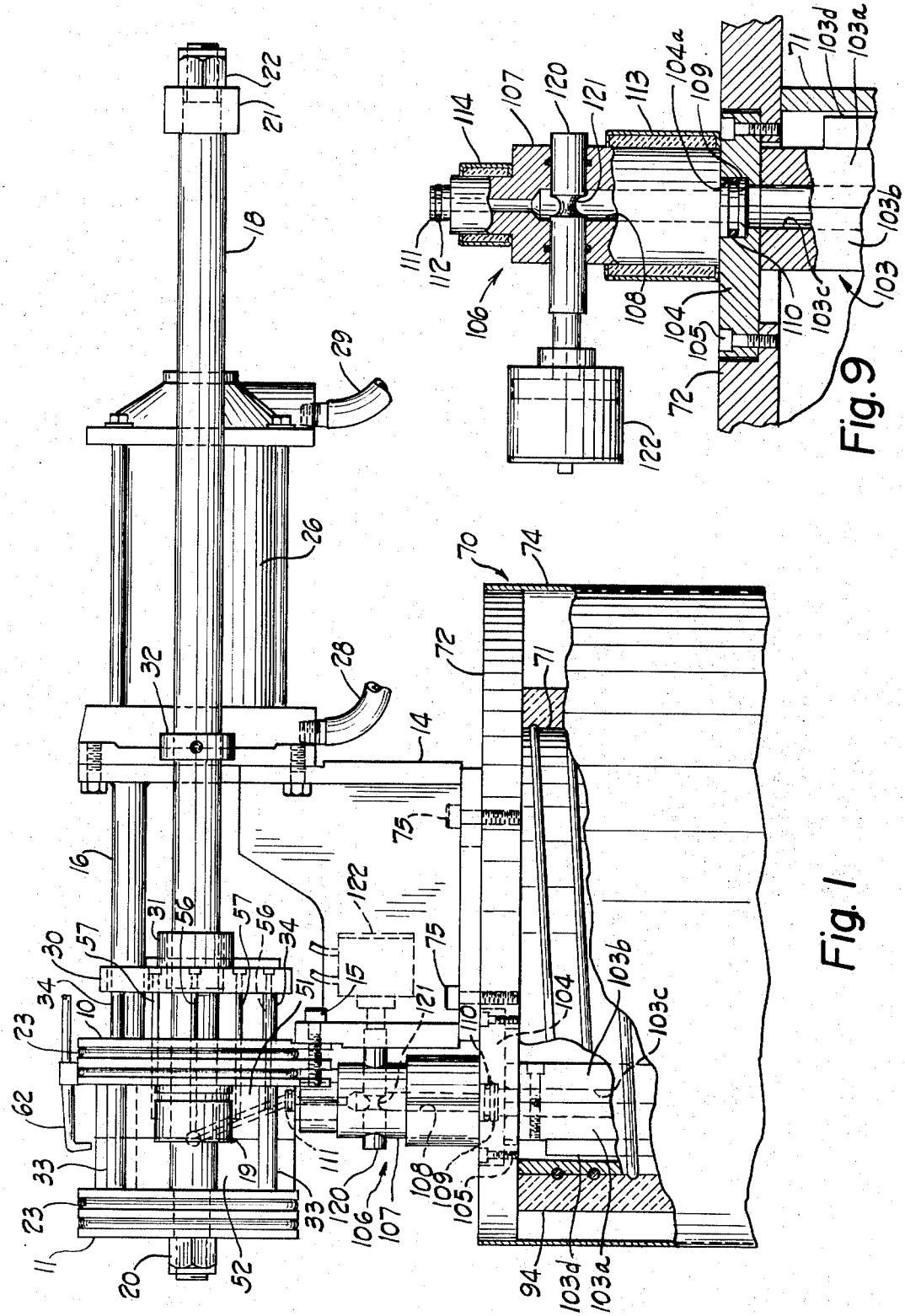
FIG. 1 is a fragmentary, side elevational view which is partially in cross-section of the injection apparatus of the present invention.
Figure 2:
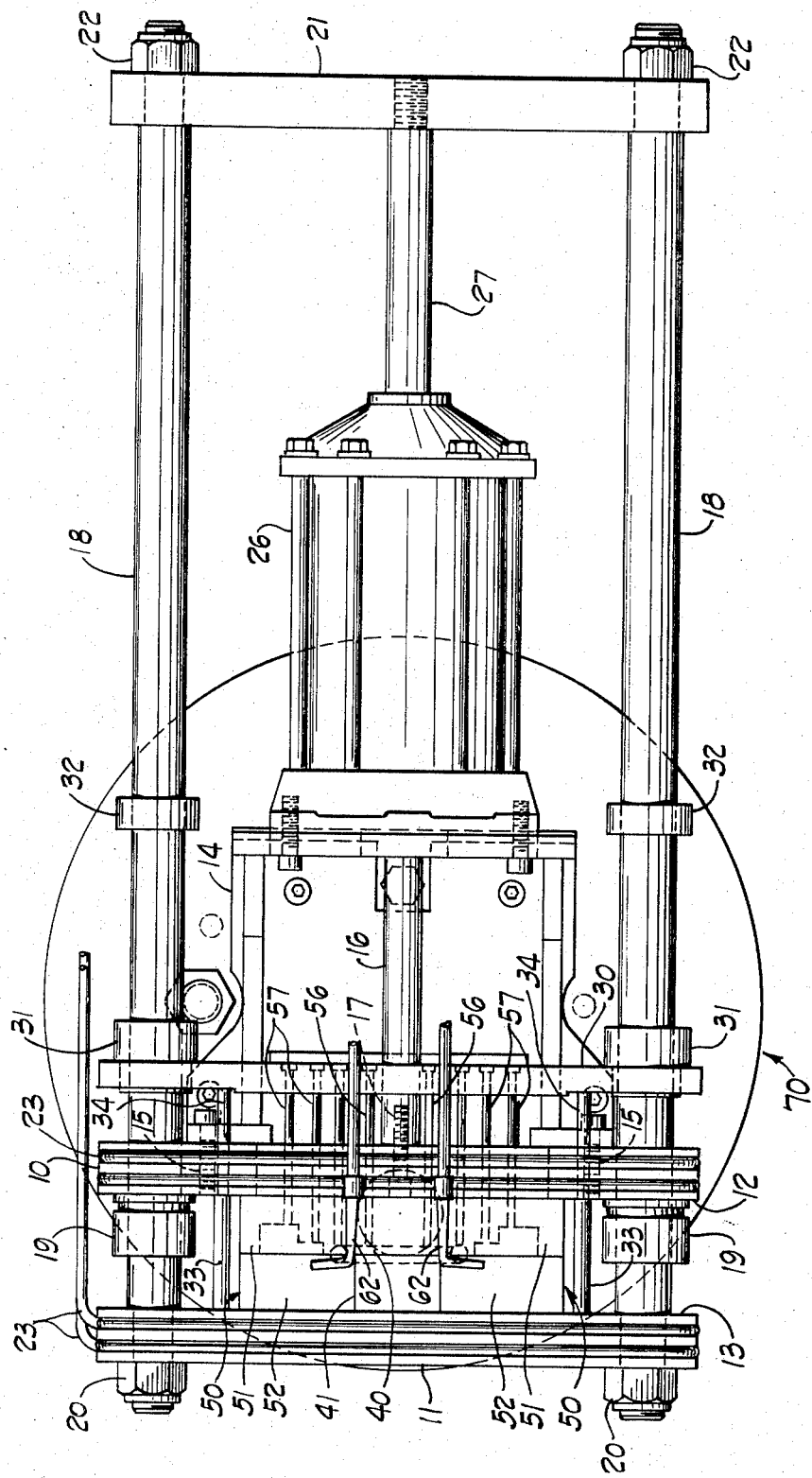
FIG. 2 is a top plan view of the apparatus shown in FIG. 1.

Referring to the drawings and to FIGS. 1-5 in particular, the illustrated embodiment of the injection apparatus is shown to comprise a fixed platen 10 and a movable platen 11 having confronting faces 12, 13, respectively. The fixed platen 10 is connected to a support bracket 14 by bolts 15. A post 16 has one end welded to the bracket 14 and its other end secured to a central portion of the platen 10 by a bolt 17. A pair of horizontal guide posts 18 slidably extend through the platen 10 in bushings 19. Each of the posts 18 has one of its ends secured to the platen 11 by a nut 20 and its other end secured to a cross bar 21 by a nut 22. Cooling coils 23 through which water is adapted to be circulated are provided around the platens 10, 11.

The assembly of the movable platen 11, the posts 18 and the cross bar 21 is reciprocated by actuation of a double-acting air cylinder mechanism 26 which is secured to the support bracket 14. The piston rod 27 of the mechanism 26 has its ends threadably connected to the cross bar 21. Air is selectively admitted to the air cylinder mechanism 26 through conduits 28, 29. When air is admitted to the cylinder mechanism through the conduit 28, the piston rod 27 is extended to draw the movable platen 11 toward the fixed platen 10. When air is admitted to the mechanism 26 through the conduit 29, the piston rod 27 is retracted to move the platen 11 away from the platen 10.

Figure 5:
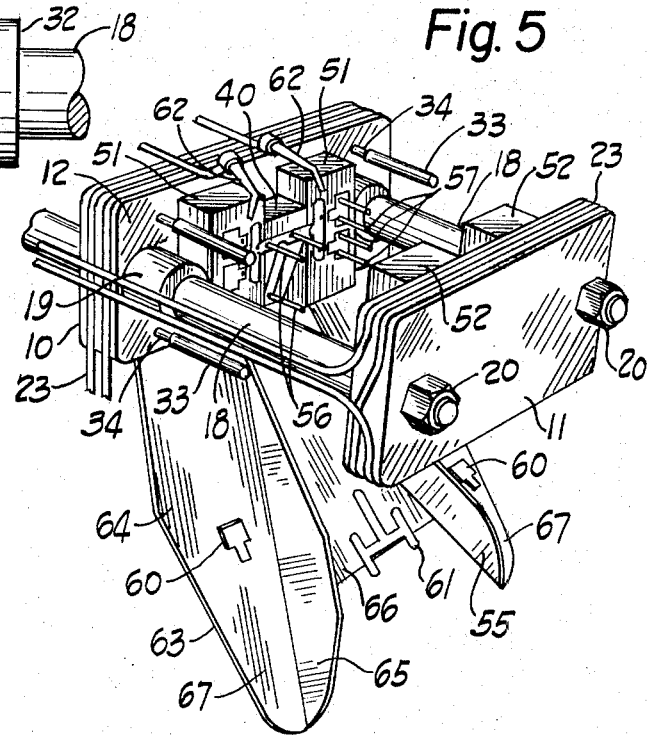
FIG. 5 is a perspective view of a portion of the apparatus.

An ejector plate 30 located behind the platen 10 is slidably supported on the posts 18 by flange bearings 31. A collar 32 is fixed on each of the posts 18 so that, when the air cylinder mechanism 26 is actuated to separate the platens 10, 11, the collars will engage the flange bearings 32 to move the ejector plate 30 toward the fixed platen 10. Four ejector posts 33 slidably extend through the fixed platen 10 and have their ends engageable with the movable platen 11 and the ejector plate 30. When the platen 11 is moved toward the platen 10 by actuation of the mechanism 26, the ejector plate 30 is pushed away from the platen 10 by the posts 33. As shown in FIG. 5, each ejector post 33 has an intermediate shoulder portion 34 which serves to limit rearward movement of the post through the fixed platen 10.

Figure 3:
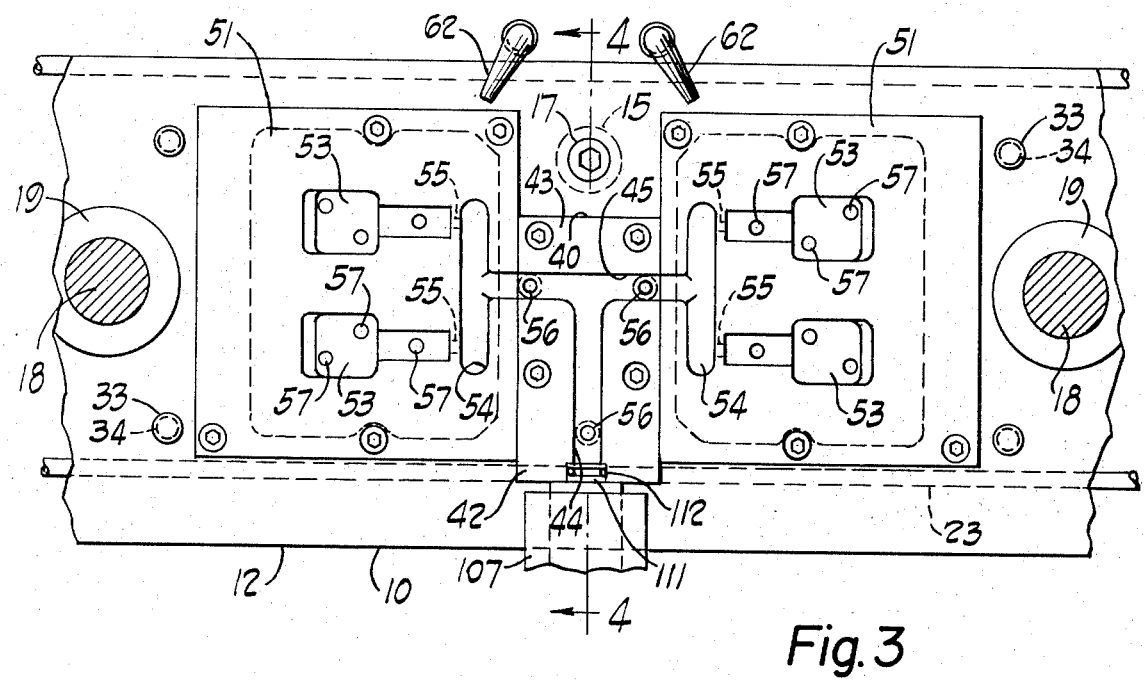
FIG. 3 is an elevational view of a portion of the apparatus.
Figure 4:
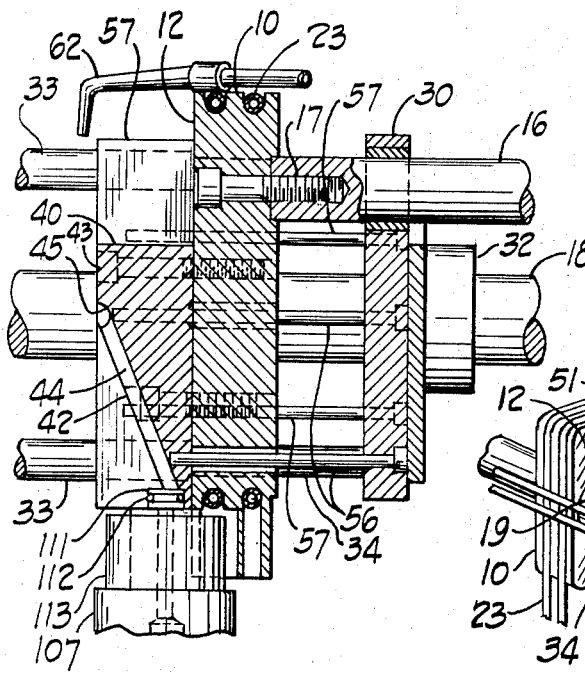
FIG. 4 is a cross-sectional view taken on the line 4—4 of FIG. 3.

Cooperating runner block members 40, 41 are respectively carried on the faces 12, 13 of the platens 10, 11 for movement between open and closed positions. As is best shown in FIGS. 3–5, the runner block member 40 is formed with a vertically inclined surface 42 and a vertical surface 43. A main runner channel 44 in the surface 42 opens at the bottom of the member 40 and extends upwardly and forwardly at an angle to the vertical which is preferably about 30°. The surface 43 is formed with a runner channel 45 which is transverse to and communicates with the channel 44. The channel 45 opens on the sides of the member 40. The other runner block member 41 has surfaces which mate with the surfaces 42, 43 and are formed with channels corresponding to the channels 44, 45. The channels cooperate in the closed position of the runner block members to define a runner cavity.

Injection die assemblies 50 are carried by the platens 10, 11 adjacent the runner block members 40, 41. As shown, each of the die assemblies 50 is comprised of a member 51 mounted on the platen face 12 adjacent a side of the runner block member 40 and a member 52 mounted on the platen face 13 adjacent a side of the runner block member 41. Referring to FIGS. 3 and 5, each of the die members 51 is shown to have a part-forming cavity 53, a runner cavity 54 which communicates with the runner block channel 45, and a tunnel gate 55 connecting the cavities 53, 54. It will be understood that a tunnel gate is formed by a bridge of metal below which the injected material flows from the runner cavity into the part-forming cavity. Ejector pins 56 slidably extend through the platen 10 and the runner block member 40 into the channels 44, 45. Similar ejector pins 57 extend through the platen 10 and the die member 51 into the cavities 53. The ejector pins 56, 57 are carried by the ejector plate 30 so that, when the platens 10, 11 are opened, the parts 60 formed in the cavities 53 and the runners 61 formed in the channels 44, 45 and in the cavities 54 will be ejected. At the same time, the parts 60 will be cut from the runners 61 by reason of the tunnel gates 55.

According to the present invention, the parts 60 and the runners 61 are ejected in such a manner that they are automatically separated and fall into different containers. As shown in FIG. 5, the runner 61 is ejected forwardly and downwardly from the runner block 40, while the severed parts 60 are ejected from the dies 51 in downwardly and laterally outward directions with respect to the trajectory of the runner. This automatic separation of the parts from the runners results in part from the shape of the cooperating faces of the runner blocks 40, 41, and more particularly from the formation of the runner channel 44 which slopes downwardly and rearwardly with respect to the platen 11. The inclined formation of the runner groove 44 assures that the runner 61 will be thrown downwardly below the block 40 in a different trajectory from the parts 60. A pair of spray nozzles 62 mounted above the platen 10 assist in causing the parts 60 to be separated laterally from the runner 61. The nozzles 62 are arranged to emit a blast of fluid into the die cavities 53 in a downwardly and laterally outward direction. The fluid apray preferably consists of a small amount of a liquid lubricant, such as a silicone fluid, carried in a stream of air, and serves to lubricate the dies 51 in addition to separating the parts from the runners. The spray nozzles 62 are preferably operated on the opening and closing strokes of the platen 11.

Structure 63 extends downwardly and forwardly from the platen 10 for the purpose of conveying the separated parts 60 and the runners 61 to separate containers (not shown). The illustrated structure 63 is comprised of a single member having a bottom wall 64 and spaced lateral walls 65 which divide the member into a central trough 66 and two side troughs 67. The runners 61 are received in the central trough 66 and the parts 60 are separately received in the laterally adjacent troughs 67.

Figure 6:
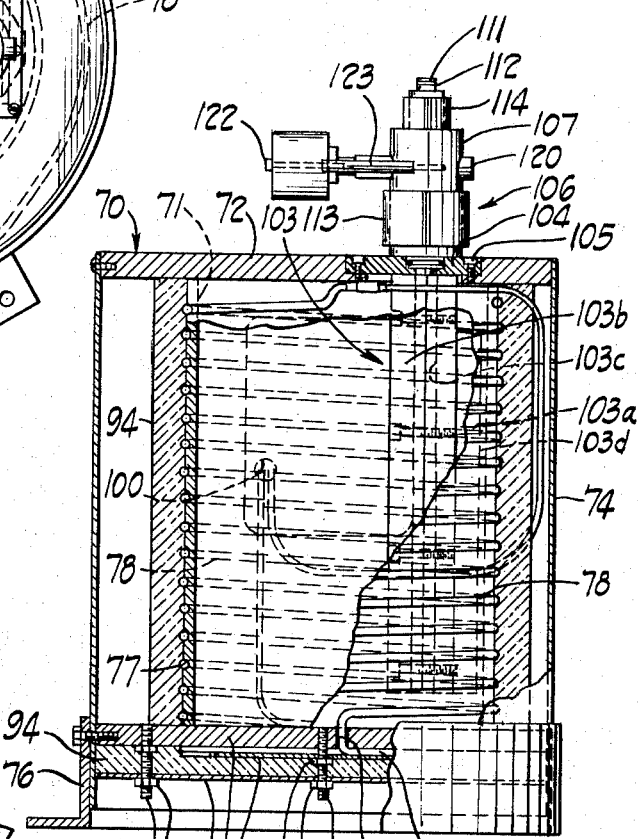
FIG. 6 is a vertical cross-sectional view of another portion of the apparatus.
Figure 8:
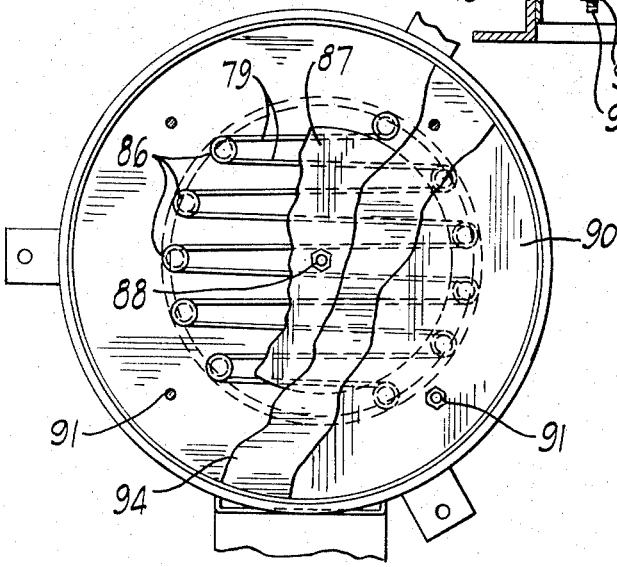
FIG. 8 is a bottom plan view with portions broken away of the portion of the apparatus shown in FIG. 6.

Fluid injection material is supplied to the runner block assembly 40, 41 from a heated reservoir 70. Referring particularly to FIGS. 6 through 9, the reservoir 70 is shown to comprise a one-piece, cylindrical metal tank 71. Upper and lower plates 72, 73, respectively are welded to the ends of the tank. The plates 72, 73 are larger in diameter than the tank 71, and a metal shell 74 is secured around the plates to form a housing in which the tank 71 is disposed. As shown in FIG. 1, the support bracket 14 for the platens 10, 11, etc., is mounted on the upper plate 72 of the reservoir by bolts 75. An annular member 76 having flanged support legs is connected to the lower plate 73 as shown in FIG. 6.

An external groove 77 is formed in the cylindrical side wall of the tank 71 and extends helically in an axial direction between the ends of the tank. A high temperature electric heating cable 78 is engaged in the groove 77. The electric heating cable 78 may be of a conventional type comprising an insulated resistor wire which provides continuous high-temperature heating up to about 400°F. In the preferred manner of construction, the groove 78 is helically cut in the side wall of the tank 71 and then heating cable 78 is snapped into the groove while rotating the tank on its axis, the cable being held in the groove by friction. As distinguished from prior art reservoir constructions where the heating wires are secured to the tank wall in line contact, the preferred construction provided by this invention is such that at least about 50% of the cable circumference is in contact with the wall of the groove 77. This assures rapid and uniform heating of the wax or other injection material in the tank. Another important advantage of the preferred embodiment in which the heating cable 78 is held in the groove 77 by a friction fit is that it is more economical to manufacture than known prior art reservoir constructions.

Provision is made to prevent the bottom wall 73 from chilling the heated injection material in the tank 71. To this end, the cable 78 has a portion 79 which projects through a hole 85 of the plate 73 to its lower surface. The cable portion 79 is passed back and forth across the lower surface of the plate 73 around locating buttons 86. The several passes of the cable portion 79 are held in place against the plate 73 by a disk 87 which is formed of a hard insulating material. A threaded stud 88 extends down from the plate 73 through the plate 87 and a nut 89 is threaded on the stud against the lower surface of the plate 87 as shown in FIG. 6. Another plate 90 is spaced below the plate 87. Threaded studs 91 extend down from the plate 73 through the plate 90 and nuts 92 are threaded on the studs against the lower surface of the plate 90 to mount it in place. The stud 88 extends through a central portion of the plate 90 and another nut 93 on this stud is engaged with the lower surface of the plate 90. Suitable refractory insulation material 94 is packed in the space between the plate 90 and the plates 73, 87. Similar insulating material 94 is wrapped around the tank 71 and the heating cable 78.

Figure 7:
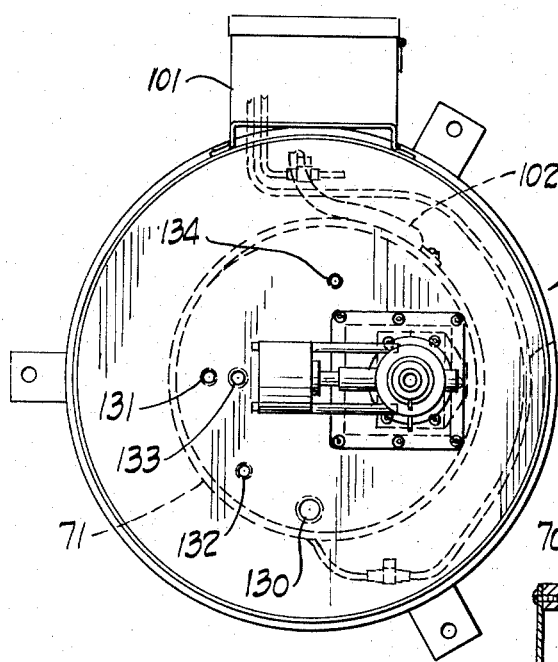
FIG. 7 is a top plan view of the portion of the apparatus shown in FIG. 6.

The ends of the electric heating cable 78 extend through a hole 100 in the shell 74 and are connected into a temperature control assembly mounted in a housing 101 which is connected to the shell 74. As shown in FIG. 7, a thermistor 102 is secured to the side wall of the tank 71 and is electrically connected to the temperature control assembly in the housing 101.

The tank 71 is adapted to be pressurized in order to force the hot, fluid injection material out of the tank through an outlet tube assembly 103 which extends down into the tank and terminates adjacent the bottom plate 73. Prior to this invention it has been conventional to employ an outlet tube in the form of a thin walled copper pipe mounted at the center of the reservoir tank. With such a construction there has been a problem of supplying the injection material at the desired temperature due to the fact that the copper pipe cools as the level of the material in the tank becomes lower. As a result, the injection material is chilled as it flows through the pipe out of the tank. This problem is overcome by the novel construction of the outlet tube assembly 103 and by the manner of mounting the assembly so that it is heated through the side wall of the tank 71.

In the preferred embodiment of the invention, the assembly 103 is a longitudinally split construction comprised of a pair of oblong, aluminum members 103a, 103b which are suitably secured together along their lengths, as by cap screws. The mating faces of the members 103a, 103b are formed with longitudinal channels which cooperate when the members are secured together to define a passage 103c extending from one end of the assembly to the other end. A plate 104 having an opening 104a is connected to the upper ends of the members 103a, 103b. As is best shown in FIG. 9, the plate 104 is seated in a recess in the upper surface of the plate 72 and is held in place by bolts 105.

The sides of the member 103a are beveled along its length as clearly shown in the drawings to provide clearance which permits the assembly 103 to be located with its outer surface 103c as close as possible to the inside surface of the tank 71. The assembly 103 being located next to the wall of the tank is heated by the coil 78, and by reason of the massive wall section provided by the aluminum members 103a, 103b, the temperature of the assembly stays relatively constant as the level of the hot injection material drops in the tank. It will thus be apparent that the construction and location of the assembly 103 are such that chilling of the hot injection material is avoided.

A nozzle assembly 106 mounted above the plate 72 serves to control the flow of heated material out of the tank 71 and to inject the material into the runner block assembly 40, 41. Referring particularly to FIGS. 1 and 9, the nozzle assembly 106 is shown to comprise a nozzle body 107 having a through, longitudinal passage 108. A nipple 109 on the lower end of the nozzle body 107 is fitted into the opening 104a of the plate 104 in communication with the outlet passage 103c. An O-ring 110 carried in a groove around the nipple 109 is in engagement with the walls of the opening 104a. A nipple 111 on the upper end of the nozzle body 107 is adapted to be received in the inlet opening of the runner dies 40, 41 in communication with the channel 44 as shown in FIG. 3. An O-ring 112 is seated in a groove around the nipple 111 for engagement with the walls of the dies 40, 41. The nozzle body 107 is heated by a band heater 113 mounted around the lower portion of the valve body and by another band heater 114 mounted around the upper end of the valve body adjacent the runner blocks 40, 41.

The flow of hot injection material through the passage 108 of the nozzle body 107 is controlled by a reciprocal valve rod 120. The valve rod 120 extends through the side walls of the nozzle body 107 to intersect the nozzle passage 108 and is formed with a circumferential groove 121. When the valve rod is positioned as shown in FIG. 9 to locate the groove 121 in the passage 108, injection material is permitted to flow past the rod. The flow of material is blocked by actuating the rod 120 to move the groove 121 out of the passage 108. The valve rod 120 is actuated by an air cylinder 122 which is connected to the nozzle body 107 by posts 123.

The top wall 72 of the reservoir assembly 70 is provided with an opening 130 through which the injection material can be placed into the tank 71. The plate 72 is also provided with a hole 131 which is adapted to be connected to a source of air pressure so that the inside of the tank 71 can be pressurized. Air can be bled from the tank through another hole 132. A depth sensor (not shown) can be mounted through an opening 133, and a thermometer (not shown) can be mounted through an opening 134 in the plate 72.

The operation of the injection apparatus will be largely apparent from the foregoing description. Dies 50 suitable for injecting the desired parts, such as investment casting patterns, are mounted on the platens 10, 11 adjacent the runner blocks 40, 41, and the upper nipple 111 of the nozzle assembly 106 is engaged in the lower end of the runner channel 44 of the runner block 40. The injection cycle is initiated by closing the platens 10, 11 and then actuating the air cylinder 122 to open the nozzle assembly passage 108. An amount of heated material sufficient to inject the dies 50 is admitted to the runner cavity through the nozzle assembly 106 and the air cylinder 122 is then actuated to close the nozzle. After a suitable time delay, the platen 11 is actuated to its open position which results in the parts 60 and runners 61 being ejected from the dies 50 and the runner block assembly 40, 41, respectively. As explained above, the parts 60 are severed from the runners 61 during ejection, and the nozzles 62 are actuated during the opening stroke of the platen 11 to emit a blast of fluid onto the dies 51 secured to the platen 10. This results in the parts 60 falling into the troughs 67 and the runners 61 falling down the central trough 66 of the structure 63. The nozzles 62 are next actuated when the platen 11 is closed to lubricate the dies for the next injection cycle. The entire operation of the apparatus, including the actuation of the air cylinders 26, 122, can be automatically controlled through a suitable control panel (not shown) and can be carried out without the attendance of an operator.

Many modifications and variations of the invention will be apparent to those skilled in the art in the light of the foregoing detailed disclosure. Therefore, it is to be understood that, within the scope of the appended claims, the invention can be practiced otherwise than as specifically shown and described.

What is claimed is:

1. Injection apparatus comprising:
    a. a pair of platens,
    b. means mounting said platens for relative movement toward and away from each other in a path transverse to a vertical plane,
    c. runner block means carried by said platens for movement between open and closed positions,
    d. said runner block means having mating faces including a pair of slanted surfaces which are inclined with respect to the vertical and another pair of surfaces,
    e. at least one of said slanted surfaces being formed with a first runner channel extending in a direction which is oblique to the vertical, and at least one of said another surfaces being formed with a second channel which communicates with and is transverse to said first channel,
    f. said channels in the closed position of said runner block means defining a runner cavity having an inlet opening communicating with said first channel and at least one outlet opening communicating with said second channel,
    g. die means supported by said platens for movement between open and closed positions,
    h. said die means having portions which in the closed position define at least one die cavity in communication with said outlet opening of said runner block means,
    i. said runner block means and said die means including means for ejecting a part formed in said die cavity and a runner formed in said runner cavity and simultaneously severing the part from the runner,
    j. nozzle means for directing a blast of fluid toward a cavity defining portion of said die means so that the severed part and runner are separated so that they may be deposited in different containers,
    k. runner receiving means below said runner block means, and
    l. part receiving means below said die means.

2. Injection apparatus comprising:
    a. a pair of platens,
    b. means mounting said platens for relative movement toward and away from each other,
    c. runner block means carried by said platens for movement between open and closed positions,
    d. said runner block means having mating surfaces including a pair of cooperating slanted surfaces which are inclined with respect to the vertical,
    e. said slanted surfaces cooperating in the closed position of said runner block means to define a runner cavity,
    f. die means supported by said platens for movement between open and closed positions,
    g. said die means having portions which in the closed position define at least one die cavity in communication with said runner cavity, and
    h. means for severing a part formed in said die cavity from a runner formed in said runner cavity and ejecting the part and runner from said cavities so that the severed part and runner are separated for depositing in different receptacles, said slanted surfaces of said runner block means acting to direct the runner in a different trajectory from the part as they are ejected.

3. Injection apparatus as claimed in claim 2 wherein said means for severing and ejecting includes nozzle means for directing a blast of fluid into a cavity defining portion of said die means, and including means for separately receiving the ejected part and runner.

4. Injection apparatus comprising:
    a. a pair of platens,
    b. means mounting said platens for relative movement toward and away from each other,
    c. runner block means carried by said platens for movement between open and closed positions,
    d. said runner block means having mating surfaces including a pair of cooperating slanted surfaces which are inclined with respect to the vertical,
    e. said slanted surfaces cooperating in the closed position of said runner block means to define a runner cavity,
    f. die means supported by said platens for movement between open and closed positions,
    g. said die means having portions which in the closed position define at least one die cavity in communication with said runner cavity,
    h. means for severing a part formed in said die cavity from a runner formed in said runner cavity and ejecting the part and runner from said cavities so that the severed part and runner are separated for depositing in different receptacles, said slanted surfaces of said runner block means acting to direct the runner in a different trajectory from the part as they are ejected,
    i. said means for severing and ejecting including nozzle means for directing a blast of fluid into a cavity defining portion of said die means, j. means for separately receiving the ejected part and runner,
k. a tank for containing a hot, fluid injection material,
l. said tank having an external, peripheral groove,
m. an electric heating cable seated in said groove and surrounding said tank,
n. insulation surrounding said tank and said cable,
o. outlet tube means extending into said tank,
p. nozzle means having an inlet communicating with said tube means, an outlet adapted to communicate with said runner cavity, and a valving means for controlling the flow of material from said outlet, and
q. means for pressurizing said tank to force heated material through said tube means and said nozzle means into said cavities.

* * * * *